United States Patent [19]

Minuhin

[11] Patent Number: 4,891,717

[45] Date of Patent: Jan. 2, 1990

[54] METHODS AND APPARATUS FOR PERFORMING HIGH DENSITY ISOTROPIC/PERPENDICULAR DIGITAL MAGNETIC RECORDING

[75] Inventor: Vadim B. Minuhin, Bloomington, Minn.

[73] Assignee: Magnetic Peripherals Inc., Minnetonka, Minn.

[21] Appl. No.: 909,797

[22] Filed: Sep. 22, 1986

[51] Int. Cl.4 ............................................... G11B 5/09
[52] U.S. Cl. ........................................ 360/41; 360/40
[58] Field of Search ................ 360/40, 46, 55, 61, 360/41

[56] References Cited

U.S. PATENT DOCUMENTS

| | | | |
|---|---|---|---|
| 3,564,558 | 8/1968 | Tolman et al. | 360/21 |
| 3,611,417 | 10/1971 | Sauter et al. | 360/21 |
| 4,219,851 | 8/1980 | Lemak | 360/40 |
| 4,484,176 | 11/1984 | Fitzpatrick | 360/40 |
| 4,663,676 | 5/1987 | Voegeli | 360/46 |
| 4,755,891 | 7/1988 | Katoh et al. | 360/46 |

FOREIGN PATENT DOCUMENTS

828216  1/1979  U.S.S.R. ............................ 360/40

*Primary Examiner*—Vincent P. Canney
*Assistant Examiner*—Kevin J. Fournier
*Attorney, Agent, or Firm*—Joseph J. Kaliko

[57] ABSTRACT

Methods and apparatus are disclosed which utilize isotropic/perpendicular medium for performing high density digital magnetic recording. According to the preferred embodiment of the invention, the 1's of a binary code are deeply imprinted on the medium by switching off the current in the winding of a magnetic ring head. The 1's so imprinted on the medium are each represented by a copy of a part of the fringing field of the ring head. Each imprinted field has the appearance of a "horseshoe" pattern of magnetization. During readback these imprinted patterns correlate extremely well with the sensitivity function (the fringing field) of the ring head/readback transducer. The invention utilizes this inherently present correlation, together with a combination of longitudinal and vertical recording techniques, to provide methods and apparatus well suited to locate signals buried in noise and yield improved overall readback performance in a high density environment. Additionally, following the imprint of each horseshoe, the preferred embodiment of the invention provides for the resumption of current flow, with opposite polarity, as the imprinted pattern(s) moves downstream. This technique continues the perpendicular magnetization at the trailing edge of a previously formed horseshoe pattern and fills voids in magnetization on the medium.

31 Claims, 5 Drawing Sheets

FIG. 1.

PRIOR ART

FIG. 2.

PRIOR ART

FIG. 3.

PRIOR ART

METHODS AND APPARATUS FOR PERFORMING HIGH DENSITY ISOTROPIC/PERPENDICULAR DIGITAL MAGNETIC RECORDING

BACKGROUND OF THE INVENTION

1. Field of the Invention

The invention generally relates to methods and apparatus for performing digital magnetic recording and readback. More particularly, the invention relates to methods and apparatus for performing high density isotropic/perpendicular recording of digital information on magnetic media where the distribution of magnetization on the media correlates well with the fringing field of the readback apparatus.

2. Description of the Related Art

Techniques for the storage of digital information in a magnetizable medium are well known. These techniques are generally based on interaction between a magnetic storage medium and a magnetic head (transducer), in relative motion with respect to one another. The magnetic head is typically comprised of a magnetic core wound with a coil, where the core includes a head gap. The gap field, with its surrounding leakage flux ("fringing field") extends into the magnetic recording surface and leaves a magnetic remanent on the storage media in write mode.

The head provides an induced voltage on readback, reflecting the rate of change of magnetization recorded on the magnetic "track." Thus, the quality of the readback output of a magnetic recording is directly related to and the correlation between the fringing field of the readback head and the derivative of the remanent media magnetization.

Known digital magnetic recording systems which attempt to maximize their data storage capacity typically suffer a degradation in readback performance. A factor in achieving maximum data storage capacity is the information density per unit area of storage surface. The storage density per unit surface area is the product of the storage density per unit track length times the track density per unit distance normal to the direction of relative motion. These two components of storage density are interrelated; an increase in track density will cause a reduction in available readback flux. This has an adverse affect on readback performance, particularly where the distribution of magnetization on the media does not correlate well with the fringing field of the readback apparatus.

By way of background, it should be understood that conventional digital magnetic recording systems use one or more of three primary modes of recording. These can be defined in terms of the direction of surface magnetization relative to the direction of track motion. These modes are: (1) longitudinal or horizontal recording, (2) perpendicular or vertical recording, and (3) transverse recording.

In longitudinal recording, the principal direction of magnetization is in the plane of the surface and parallel to the direction of surface motion. In vertical recording, the principal orientation of the magnetization is normal to the plane of the surface. In transverse recording, the storage medium is magnetized in the plane of its surface but normal to the direction of motion between the head and surface. These recording modes are well known in the prior art.

In addition to the recording modes and by way of further background, it should be understood that conventional systems create the remanent media magnetization itself by one of two methods. The first method requires switching the polarity of the continuous current in the winding of the write head. The second method requires the application of short current pulses in the head winding.

According to the first, most frequently used method, the value of 0's of encoded bits is represented by the constant state of media magnetization, while the value of 1's of encoded bits is represented by the change of the state of media magnetization. This change is accomplished by the change in the polarity of the continuous write current in the head winding. As moving media passes the head it is magnetized by the field created by the constant current in the winding to the one definite state. At the moments of the changes in current polarity, corresponding changes in the polarity of remanent media magnetization occur at the trailing edge of the head. These changes are formed in the area where the intensity of the head field decreases to the value of the media coercivity. The "recording zone" for this method is outside of the area of the most intensive gap field, i.e. where the field is much greater then media coercivity.

According to the second conventional recording method, which may be used to record on media that is previously demagnetized, short current pulses of different polarity in the head winding create corresponding intervals of saturated magnetization, of different polarity, on the previously demagnetized media. One polarity corresponds to 1's; the other polarity corresponds to the 0's of the encoded bits. In this case, changes in the media magnetization occurs at both the trailing and leading edges of the head, outside of the gap. Therefore, the "recording zones" again do not coincide with the area of most intensive head field in the gap. In practical situations, "imprints" of each current pulse are much wider than the gap size.

According to a variant of this second method, where previously saturated media is used, current pulses are always of the same polarity. The pulses create media intervals where magnetization polarity is reversed relative to the prerecorded state. These revisions represent the 1's of the encoded bits; 0's being represented by the absence of the changes in the media magnetization. Otherwise, the method is similar to the aforesaid second conventional recording method.

A common disadvantage of both of the methods described hereinabove, is the under utilization of the write field of the head during recording. Due to highly assymmetrical and skewed nature of the magnetic field outside the gap, changes in the media magnetization written "by the edges of the head" on different layers of media are out of correct phase in relation to each other. Additionally, due to the insufficient gradient of the head field outside of the gap, written changes in magnetization are blurred.

As a result, written patterns of the recorded bits, recorded via the prior art methods, are blurred and do not correlate well with the whole fringing field of the readback transducer. Therefore, the resolution and signal to noise ratio in the readback signal suffer.

U.S. Pat. No. 3,564,558, issued Aug. 26, 1968 to Tolman et al, entitled "High-Density Magnetic Recording Scheme", dealing with surface recording on extremely thin magnetic media using a combination of transverse and longitudinal magnetic write fields, typifies the prior art approach to recording. Tolman utilizes the trailing edge of the write field for recording, in other words, recording occurs in the area where the write field reduces itself to the value of media coercivity. Hence, once again, the distribution of magnetization on the media will not be well correlated with the fringing field of the readback transducer.

SUMMARY OF THE INVENTION

According to the preferred embodiment of the invention, the 1's of a binary code are deeply imprinted on an isotropic or perpendicular magnetic recording medium by switching off the current in the winding of a magnetic ring head. The 1's so imprinted on the medium are represented by copies of portions of the fringing field of the ring head. Each imprinted part of the fringing field has the appearance of a "horseshoe" pattern of magnetization. During readback these imprinted patterns correlate extremely well with the sensitivity function (the fringing field) of the ring head/readback transducer. The invention utilizes this inherently present correlation, together with a combination of longitudinal and vertical recording techniques, to provide methods and apparatus well suited to initially record, subsequently locate signals buried in noise and yield improved overall readback performance (e.g. achieve improved resolution) in a high density environment.

Additionally, following the imprint of each horseshoe the preferred embodiment of the invention provides for the resumption of current flow, with opposite polarity, as the imprinted pattern(s) moves downstream. This technique continues the perpendicular magnetization at the trailing edge of a previously formed horseshoe pattern and fills voids in magnetization on the medium.

It is an object of the invention to improve the readback performance of magnetic recording systems utilizing isotropic/perpendicular media for high density storage. In particular it is an object of the invention to improve the signal to noise ratio and resolution of such systems. It is a further object of the invention to achieve a distribution of magnetization on such media that correlates well with the fringing field of the readback transducer.

It is still a further object of the invention to fill voids in magnetization on said media to provide means to prevent undesirable (unrelated to the intentional writing of bits) changes of remanent media magnetization.

These and other objects and features of the present invention will become apparent to those skilled in the art upon consideration of the following detailed description and the accompanying Drawing, in which like reference designations represent like features throughout the figures.

DETAILED DESCRIPTION

Figure 1:
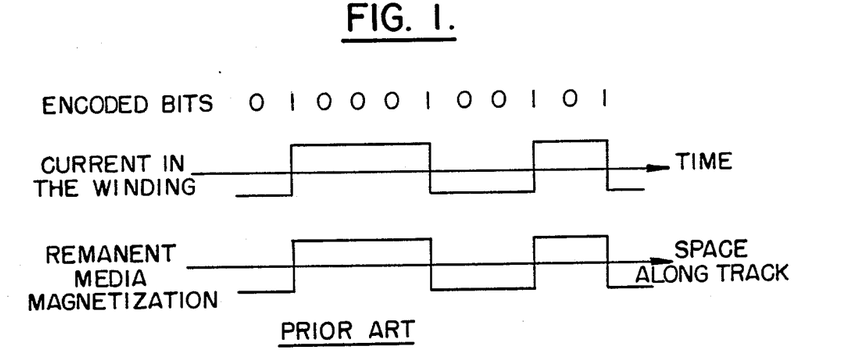
FIG. 1 depicts the resultant remanent media magnetization when encoding is performed by using the prior art method of switching polarity of a continuous current in the winding of a magnetic head.
Figure 2:
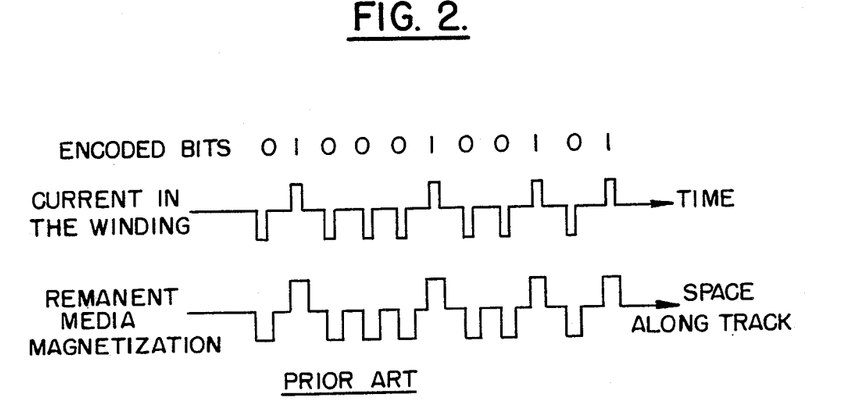
FIG. 2 depicts the resultant remanent media magnetization when recording on previously demagnetized media is performed by using the prior art method of applying short current pulses in the head winding.
Figure 3:
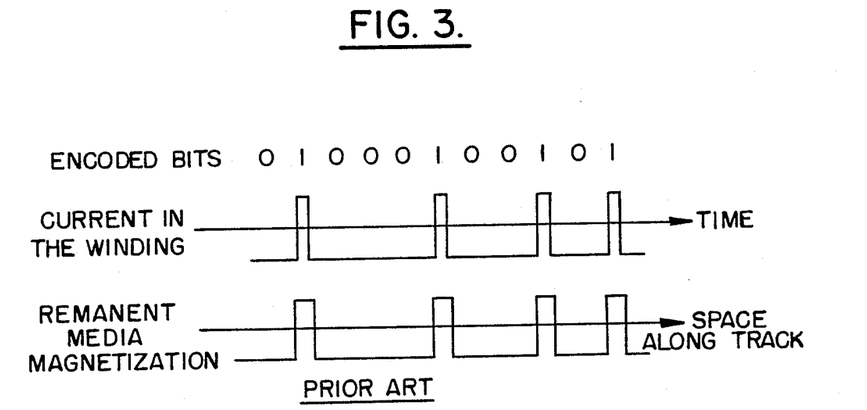
FIG. 3 depicts the resultant remanent media magnetization when recording on previously saturated media is performed using the prior art method of applying short current pulses in the head winding.

FIGS. 1, 2 and 3 illustrate the prior art methods, described hereinbefore, for forming remanent media magnetization in conventional digital magnetic recording systems.

The resultant remanent media magnetization, when encoding is performed using the prior art method of switching polarity of a continuous current in the winding of a magnetic head, is shown in FIG. 1. More particularly, FIG. 1 depicts the value of 0's of encoded bits represented by the constant state of media magnetization, while the value of 1's of encoded bits is shown represented by the change of state of media magnetization along the recording track.

FIG. 2 depicts the resultant media magnetization using the previously described method of applying short current pulses in the head winding to previously demagnetized media. It can be seen with reference to FIG. 2 that the short current pulses, of different polarity, in the head winding create corresponding intervals of saturated magnetization, of different polarity, on the previously demagnetized media. One polarity corresponds to the 0's of the binary code; the other corresponds to the 1's of the code.

FIG. 3 depicts the resultant media magnetization using the previously described variant of the short current pulse method, i.e., the variant where previously saturated media is utilized together with current pulses always having the same polarity.

As indicated hereinbefore, the recording method illustrated in FIG. 1 negatively impacts readback performance in that the depicted changes in remanent media magnetization occur at the trailing edge of the head, i.e., outside the area of the most intensive gap field. Also, as indicated hereinbefore, the recording methods illustrated in FIGS. 2 and 3 are problematic with respect to readback performance in that media magnetization occurs at both the trailing and leading edges of the head. Here too, the "recording zones" do not coincide with the area of the most intensive head field in the gap. FIGS. 2 and 3 illustrate the fact that the "imprint" of each of the current pulses is much wider than the gap size.

The present invention assumes the use of media which can support perpendicular magnetization (isotropic or perpendicular media). In addition, it is assumed that the actual binary code being recorded does not have adjacent ones. Such codes are well known and a most suitable example for recording purposes, without limiting the scope of the invention, is the well known run length limited (2,7) coding scheme.

Figure 4:
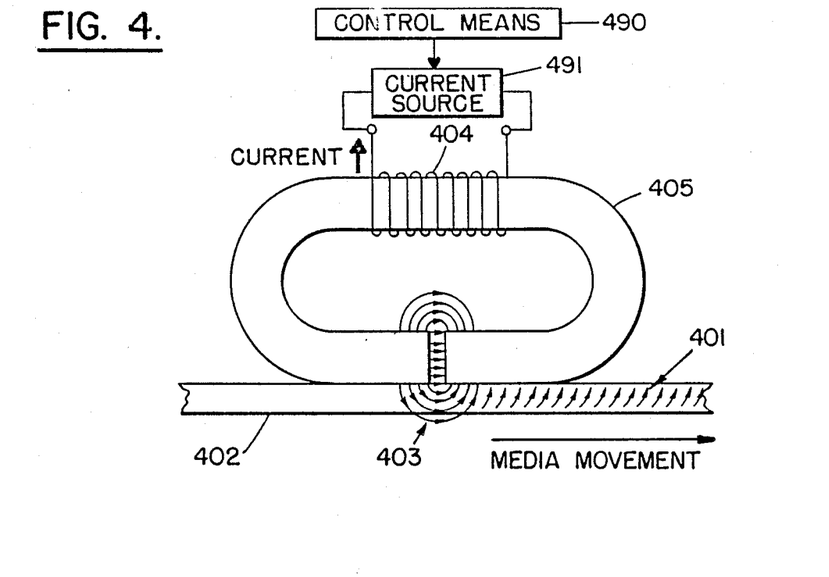
FIG. 4 depicts the predominantly perpendicular remanent magnetization that occurs in layers close to the surface of isotropic or perpendicular media when using the recording techniques taught herein. The media is shown moving through the area of a strong head field created by the current in the depicted head winding.

FIG. 4 depicts the predominantly perpendicular remanent magnetization 401 that occurs in layers close to the surface of isotropic or perpendicular media when using the recording techniques taught herein. These are the key layers of the medium contributing to the readback signals in systems of high density recording.

In its initial state of recording, the media, shown in FIG. 4 to include track 402, moves through the area of a strong head field, 403, created by the current in the depicted head winding 404 of head 405. The current is indicated as having a first polarity by the arrow located adjacent to winding 404. The moving media acquires a constant state of magnetization as it passes the head. The direction of the remanent media magnetization at different media layers will be principally determined by the field at the trailing edge of the head. This is where the value of the field is equal to the media coercivity as is the case for the prior art recording techniques described hereinbefore. During readback with inductive heads (which react on the derivative of the magnetic flux in the winding) such intervals of constant magnetization will not produce any output.

According to the invention, the 1's of a code stream (e.g. a (2,7) code), are each recorded by switching off the current in winding 404. According to the preferred embodiment of the invention the current switching is performed monotonically. At the moment current is switched off, an imprint of a part of the fringing field of the head is formed on the media. As indicated hereinbefore this imprint has the appearance of a "horseshoe" like pattern of magnetization and correlates extremely well with the sensitivity function of the same readback transducer.

Means for switching winding 404 current off in response to detecting a 1 in a code stream and for switching it back on with reversed polarity after a time delay, are well known to those of ordinary skill in the art. These control means, which for example can be realized by an off-the-shelf encoder coupled to a microprocessor controlled switch which in turn is coupled to a current source of dual polarity is shown in FIGS. 4–10 as unit 490. The current source is also depicted in FIGS. 4–10 as unit 491 and can be realized by a transistor H (bridge structure) switch. However, the way in which these means are iteratively utilized in combination with isotropic/perpendicular media to imprint the aforementioned part of the fringing field of the head on the media in response to detecting the presence of 1's in the code stream, in accordance with the teachings herein, is new.

Figure 5:
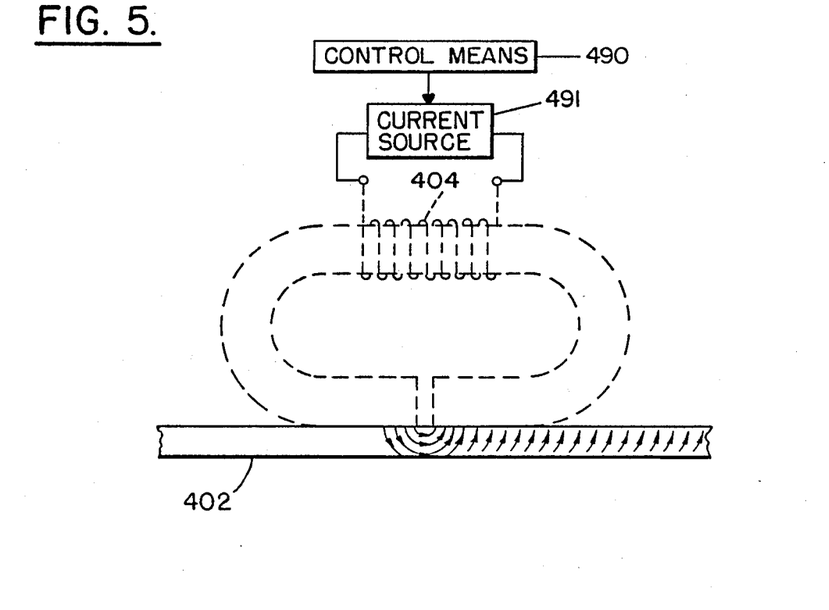
FIG. 5 depicts, in accordance with the teachings of the invention, the forming of a part of the fringing field (of the magnetic head shown) on the depicted media at the moment current is switched off in the head winding.
Figure 6:
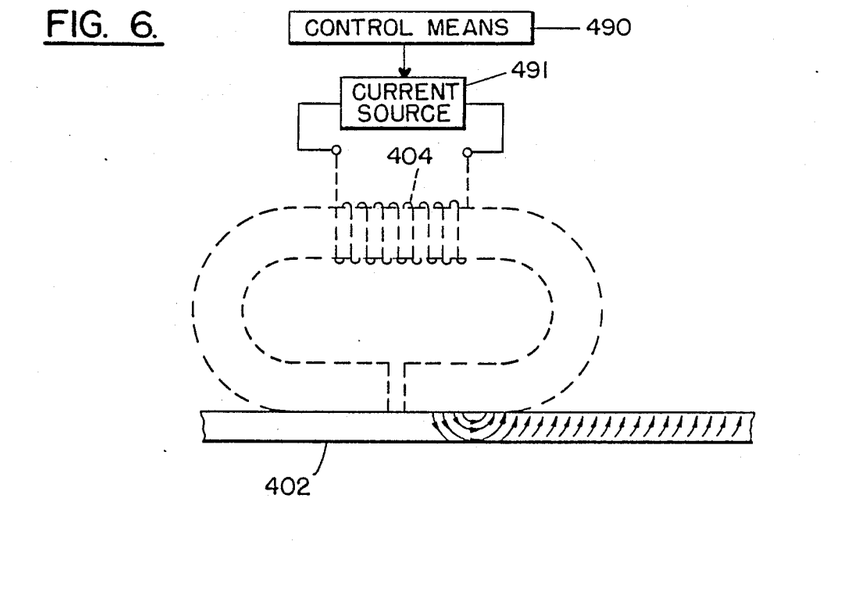
FIG. 6 and FIG. 7 taken together depict the movement of the magnetic media from the position shown in FIG. 5, until the reenabling of current in the head winding with polarity reversed with respect to the current direction shown in FIG. 4.

It can be seen with reference to FIG. 5 and FIG. 6 that while current is switched off, the media (track 402) continues to move downstream with the imprint on it. It should be noted that the imprint relaxes to some extent due to demagnetization.

Figure 7:
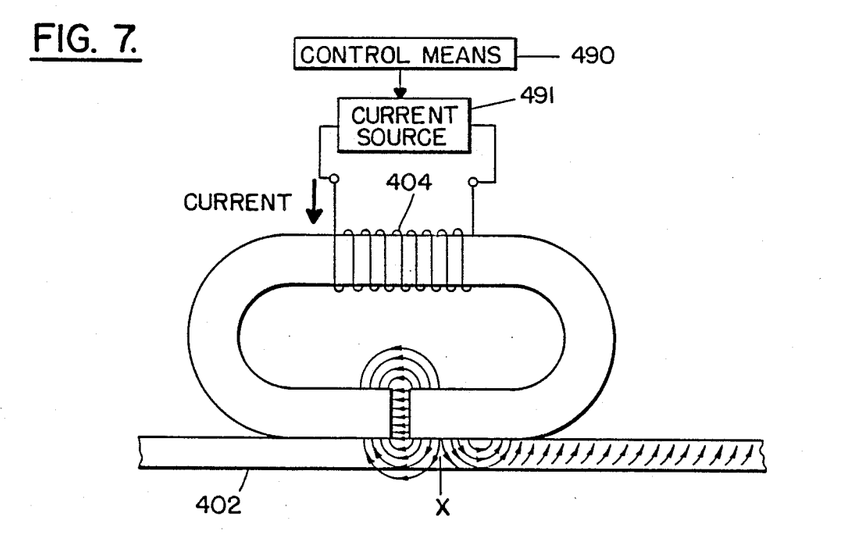

When the imprint reaches a "safe distance" (to be defined hereinafter) from the gap, into a region where the intensity of the fringing field is less then the media coercivity, the current in winding 404 is, according to the preferred embodiment of the invention, reenabled, but with reversed polarity. This is illustrated in FIG. 7 where the arrow indicating current polarity is shown pointing opposite the direction of the arrow shown in FIG. 4. This continues the perpendicular magnetization at the trailing edge of previously formed "horseshoe" pattern and fills voids in magnetization.

The preferred embodiment of the invention requires that the newly created magnetization at the trailing edge of the head must be linked together with the magnetization which was previously formed at the trailing edge of the previous imprint so that no changes in the media magnetization will be created between intentionally imprinted ones. This linkage is illustrated in FIG. 7 at the point labeled "X" where the two "horseshoes" abut one another. It should be noted that this linkage process together with the filling of the voids between imprints with perpendicular magnetization, while a desirable feature, is not to be construed as a requirement for practicing the invention. The readback characteristics of the imprints of the 1's left on the media, as taught hereinbefore, will be significantly improved over the prior art recording and readback approaches whether or not the linkage and void filling feature is a part of the system.

Again, the basic purpose of the current reenabling is to prevent the undesirable (unrelated to the intentional writing of bits) changes in the media magnetization.

The "safe distance" referred to hereinbefore is defined as the product of the speed at which the media moves relative to the head, times $T_{off}$, which in turn is defined hereinafter as the optimal amount of time without current in the winding. $T_{off}$ is an arbitrary value that may be preselected as a compromise between the time required not to damage the previously imprinted bits and the desired maximum density of the recording system.

Figure 8:
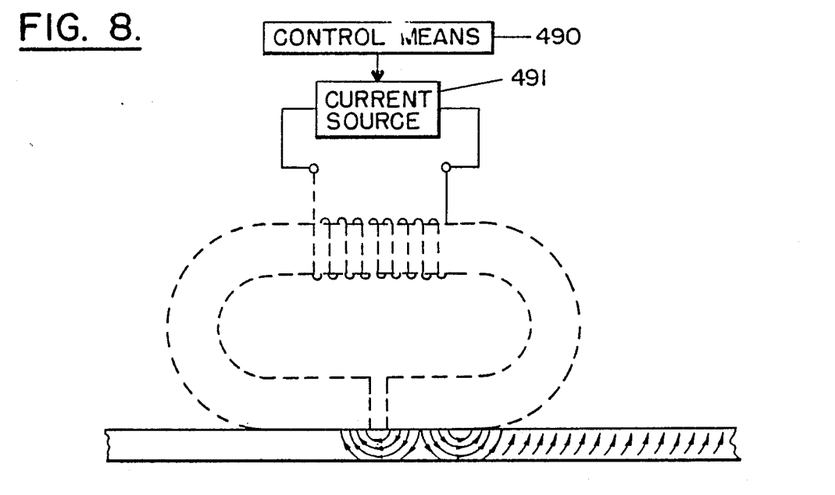
FIG. 8 depicts an embodiment of the invention where the spacing between encoded 1's on the media is at the minimal distance allowable by the code used.
Figure 9:
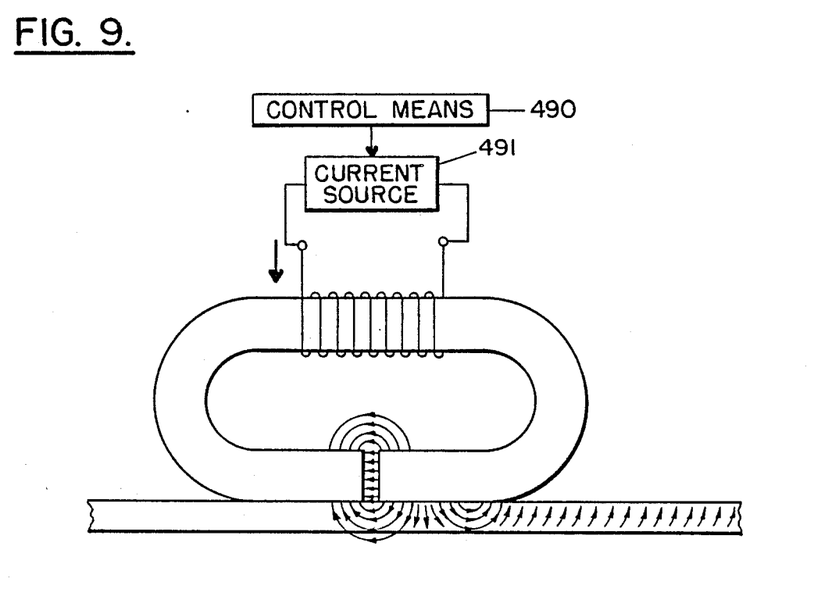
FIG. 9 and FIG. 10 taken together depict an embodiment of the invention where the spacing between encoded 1's on the media is at a non-minimal distance.
Figure 10:
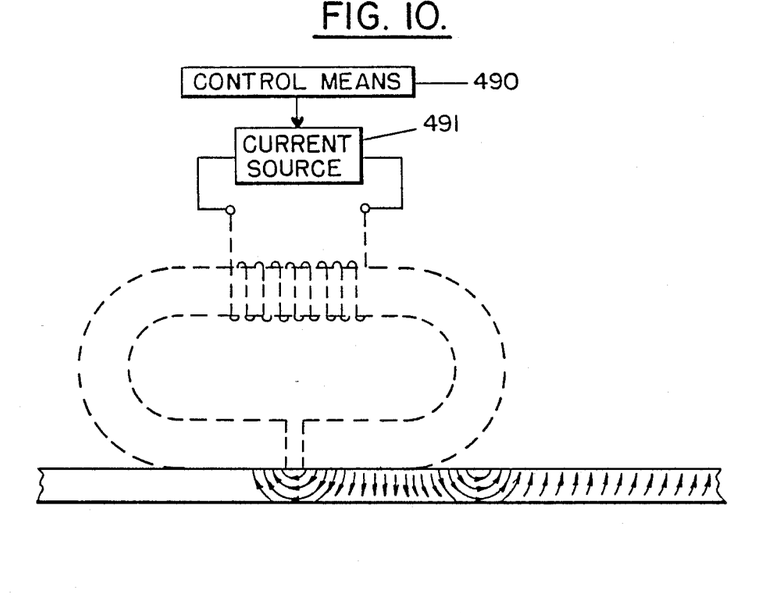

Depending on the desirable distance between particular encoded 1's, typically determined by the code pattern used, current can be either switched off very shortly after it was enabled, as illustrated by the remanent left on the track shown in FIG. 8, or it can stay on some necessary (or desired) time before switching off as indicated by FIGS. 9 and 10 taken together. In the first case two 1's bits at minimum distance allowable by the code used will be written (FIG. 8). In the second case, two 1's bits at non-minimal distance allowable by the code will be written (FIG. 10). The distances referred to are the distances on the media between adjacent horseshoe imprints.

Figure 11:
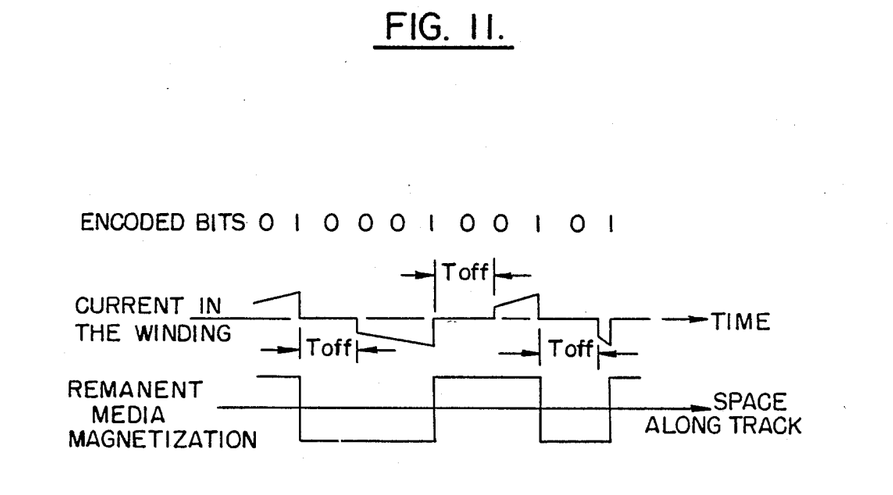
FIG. 11 graphically illustrates the shape of the current in the winding of a write head and the corresponding distribution of perpendicular remanent magnetization on the medium surface.

Finally, reference should be made to FIG. 11 which illustrates schematically the shape of the current in the winding of a write head and the corresponding distribution of perpendicular magnetization at the medium surface. The time intervals $T_{off}$, correspond to the aforementioned optimal time periods with no current in the winding.

By iteratively using the techniques described hereinabove with reference to the preferred embodiment, only wanted imprints of encoded 1's will remain as a remanent magnetization on the media. Each horseshoe imprint in succession will be of opposite polarity. Voids in between imprints will be linked by constant (predominantly perpendicular) magnetization.

Recorded imprints of a part of the fringing field of the write head will naturally correlate very well with the fringing field of the same transducer during readback.

This will drastically improve the quality of readback signal in comparison to the prior art techniques.

The foregoing description of a preferred embodiment of the novel methods and apparatus for achieving the objects of the invention has been presented for purposes of illustration and description. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular use contemplated.

It is intended that the scope of the instant invention be defined by the claims appended hereto.

What is claimed is:

1. Apparatus for performing high density digital magnetic recording of a binary code string using isotropic/perpendicular media, comprising:
   (a) means for generating a current;
   (b) means, including a magnetic head which further includes a winding coupled to said means for generating a current, for generating a magnetic field having a polarity corresponding to the polarity of the current coupled to said winding;
   (c) means for inductively coupling said magnetic head and said media as said head and said media move longitudinally with respect to one another; and
   (d) control means, for switching said current off in said winding in response to detecting a one in said binary code string to thereby cause part of the fringing field of said head to be imprinted on said media leaving a horseshoe type magnetic remanent thereon, and for reenabling said switched off current, in the opposite polarity, after a time delay $T_{off}$.

2. Apparatus as set forth in claim 1 wherein said control means is iteratively operative, upon the detection of subsequent ones in said code string, to thereby cause horseshoe type magnetic remanent imprints of opposite polarity to be left on said media.

3. Apparatus as set forth in claim 2 wherein a predominantly perpendicular magnetic remanent, corresponding to the polarity of the current applied to said winding, fills voids on said media between adjacent horseshoe imprints.

4. Apparatus as set forth in claim 3 wherein said perpendicular magnet remanent is linked to the trailing edge of a horseshoe imprint on said media.

5. Apparatus as set forth in claim 4 wherein said current is switched off monotonically.

6. Apparatus as set forth in claim 5 wherein said magnetic head is a ring type head having a recording/readback head gap.

7. Apparatus as set forth in claim 6 wherein the sensitivity function of said readback head gap is matched to the horseshoe type imprints left on said media to facilitate the accurate reproduction of said binary code whenever said head is used to readback remanent media magnetization.

8. Apparatus as set forth in claim 7 wherein said binary code is a run length limited (2,7) code.

9. Apparatus for performing high density digital magnetic recording of a binary code string using isotropic/perpendicular media comprising:
   (a) means for generating a current;
   (b) a magnetic head, including a head winding coupled to said means for generating a current, having a recording gap that is inductively coupled to said isotropic/perpendicular media, for leaving a magnetic remanent on said media which corresponds to said binary code as said media moves longitudinally with respect to said gap;
   (c) means for detecting the ones in said binary code as they are to be recorded;
   (d) means, responsive to the detection of each one in said binary code, for switching said current off in said winding to thereby cause part of the fringing field of said head to be imprinted on said media leaving a horseshoe type magnetic remanent thereon; and
   (e) means for switching said current on, with opposite polarity, after a preselected time interval, $T_{off}$, wherein $T_{off}$ is at a minimum the time required to insure that the imprint of previously recorded bits are not damaged as said media moves relative to said gap.

10. Apparatus as set forth in claim 9 wherein said magnetic head is operative in a readback mode to identify the magnetic horseshoes imprinted on said media.

11. Apparatus as set forth in claim 10 wherein the sensitivity function of said magnetic head, operating in said readback mode, is matched to the magnetic remanent previously recorded on said media.

12. Apparatus for performing high density digital magnetic recording and readback of a binary code string using isotropic/perpendicular media comprising:
   (a) means for generating a current;
   (b) a magnetic head, including a head winding coupled to said means for generating a current, having a recording/readback gap that is inductively coupled to said isotropic/perpendicular media, for, in a write mode, leaving a magnetic remanent on said media which corresponds to said binary code as said media moves longitudinally with respect to said gap and for, in a readback mode, reading said magnetic remanent to generate output signals corresponding to the binary code recorded on said media;
   (c) control means, operative in said write mode, for detecting the ones in said binary code as they are to be recorded and for switching said current off in said winding whenever a one is detected to thereby cause part of the fringing field of said head to be imprinted on said media leaving a horseshoe type magnetic remanent thereon; and
   (d) means, operative in said write mode, for switching said current on with opposite polarity after a preselected time interval $T_{off}$, wherein $T_{off}$ is at a minimum the time required to insure that the imprint of previously recorded bits are not damaged as said media moves relative to said gap.

13. Apparatus as set forth in claim 12 wherein the sensitivity function of said magnetic head, operating in said readback mode, is matched to the magnetic remanent previously recorded on said media.

14. A method for performing high density digital magnetic recording of a binary code string using isotropic/perpendicular media, comprising the steps of:
   (a) generating a current;

(b) generating a magnetic field, utilizing said current, wherein the polarity of said field corresponds to the polarity of said current;

(c) imprinting said media with a magnetic remanent by passing said media longitudinally through said field;

(d) switching said current off whenever a one in said binary code string is to be imprinted on said media to thereby leave a horseshoe type magnetic remanent thereon; and (e) reenabling said switched off current, in the opposite polarity, after a time delay $T_{off}$.

15. A method as set forth in claim 14 wherein said step of generating a magnetic field is performed utilizing a magnetic head that includes a winding energized by said current.

16. A method as set forth in claim 15 wherein said step of imprinting is performed by inductively coupling said magnetic head and said media.

17. A method as set forth in claim 16 wherein said step of switching is performed by deenergizing said winding.

18. A method as set forth in claim 14 wherein said steps of switching and reenabling are respectively performed in succession for each one to be recorded to thereby cause horseshoe type magnetic remanent imprints of opposite polarity to be successively left on said media with a spacing representative of the spacing of the ones of said code.

19. A method for performing high density digital magnetic recording of a binary code string using isotropic/perpendicular media, comprising the steps of:
(a) generating a current;
(b) generating a magnetic field, utilizing a magnetic head that includes a winding energized by said current, wherein the polarity of said field corresponds to the polarity of said current;
(c) coupling said magnetic head and said media inductively as said head and said media move longitudinally with respect to one another;
(d) switching said current off in said winding whenever a one in said binary code string is to be recorded to thereby cause part of the fringing field of said head to be imprinted on said media leaving a horseshoe type magnetic remanent thereon; and
(d) reenabling said switched off current, in the opposite polarity, after a time delay $T_{off}$.

20. A method as set forth in claim 19 wherein said steps of switching and reenabling are performed in succession for each one to be recorded to thereby cause horseshoe type magnetic remanent imprints of opposite polarity to be successively left on said media with a spacing representative of the ones of said code.

21. A method as set forth in claim 20 further comprising the step of filling voids on said media between adjacent horseshoe imprints with a predominantly perpendicular magnetic remanent, the polarity of which corresponds to the polarity of the current applied to said winding.

22. A method as set forth in claim 21 further comprising the step of linking said perpendicular magnet remanent to the trailing edge of a horseshoe imprint on said media.

23. A method as set forth in claim 22 wherein current switching is performed monotonically.

24. A method as set forth in claim 23 wherein said magnetic head is a ring type head having a recording-/readback head gap.

25. A method as set forth in claim 24 wherein the sensitivity function of said readback head gap is matched to the horseshoe type imprints left on said media to facilitate the accurate reproduction of said binary code whenever said head is used to readback remanent media magnetization.

26. A method as set forth in claim 25 wherein said binary code is a run length limited (2,7) code.

27. A method for performing high density digital magnetic recording of a binary code string using isotropic/perpendicular media, comprising the steps of:
(a) generating a current;
(b) generating a magnetic field utilizing a magnetic head, wherein said head includes both a winding, coupled to said means for generating a current, and a recording gap;
(c) coupling said head and said media inductively to thereby leave a magnetic remanent on said media which corresponds to said binary code as said media moves longitudinally with respect to said gap;
(d) detecting the ones in said binary code as they are to be recorded;
(e) switching the current in said winding off in response to the detection of each one in said code to thereby cause part of the fringing field of said head to be imprinted on said media, leaving a horseshoe type magnetic remanent thereon whenever a one is detected; and
(f) switching said current on, with opposite polarity, after a preselected time interval, $t_{off}$, wherein $T_{off}$ is at a minimum the time required to insure that the imprint of previously recorded bits are not damaged as said media moves relative to said gap.

28. A method as set forth in claim 27 further comprising the step of identifying the magnetic horseshoes imprinted on said media whenever said magnetic head is operative in a readback mode.

29. A method as set forth in claim 28 further comprising the step of matching the sensitivity function of said magnetic head, operating in said readback mode, to the magnetic remanent previously recorded on said media.

30. A method for performing high density digital magnetic recording and readback of a binary code string using isotropic/perpendicular media, comprising the steps of:
(a) generating a current;
(b) generating a magnetic field utilizing a magnetic head, wherein said head includes both a winding, coupled to said means for generating a current, and a recording/ readback gap;
(c) coupling said head and said media inductively to thereby leave, in a write mode, a magnetic remanent on said media which corresponds to said binary code as said media moves longitudinally with respect to said gap and for, in a readback mode, reading said magnetic remanent to generate output signals corresponding to the binary code recorded on said media;
(d) detecting, in said write mode, the ones in said binary code as they are to be recorded; and
(e) switching the current off in said winding whenever a one is detected to thereby cause part of the fringing field of said head to be imprinted on said media, leaving a horseshoe type magnetic remanent thereon for each one in said code; and
(f) switching said current on with opposite polarity, in said write mode, after a preselected time interval $T_{off}$, wherein $T_{off}$ is at a minimum the time required to insure that the imprint of previously recorded bits are not damaged as said media moves relative to said gap.

31. A method as set forth in claim 30 which further comprises the step of matching the sensitivity function of said magnetic head, operating in said readback mode, to the magnetic remanent previously recorded on said media.

* * * * *